United States Patent
Kono et al.

(10) Patent No.: US 11,939,463 B2
(45) Date of Patent: Mar. 26, 2024

(54) RESIN COMPOSITION AND USES THEREOF

(71) Applicant: NIPPON PAPER INDUSTRIES CO., LTD., Kita-ku (JP)

(72) Inventors: Masaru Kono, Tokyo (JP); Hitomi Abe, Tokyo (JP); Minoru Yada, Tokyo (JP); Naosuke Komoto, Tokyo (JP)

(73) Assignee: NIPPON PAPER INDUSTRIES CO., LTD., Kita-ku (JP)

(*) Notice: Subject to any disclaimer, the term of this patent is extended or adjusted under 35 U.S.C. 154(b) by 336 days.

(21) Appl. No.: 17/281,844

(22) PCT Filed: Sep. 25, 2019

(86) PCT No.: PCT/JP2019/037683
§ 371 (c)(1),
(2) Date: Mar. 31, 2021

(87) PCT Pub. No.: WO2020/071214
PCT Pub. Date: Apr. 9, 2020

(65) Prior Publication Data
US 2021/0395511 A1 Dec. 23, 2021

(30) Foreign Application Priority Data
Oct. 2, 2018 (JP) .................. 2018-187063

(51) Int. Cl.
| | | |
|---|---|---|
| *C08L 51/06* | (2006.01) | |
| *C08F 220/28* | (2006.01) | |
| *C08L 23/16* | (2006.01) | |
| *C08L 23/28* | (2006.01) | |
| *C09D 5/00* | (2006.01) | |
| *C09D 151/06* | (2006.01) | |
| *C09J 151/06* | (2006.01) | |

(52) U.S. Cl.
CPC .......... *C08L 51/06* (2013.01); *C08F 220/286* (2020.02); *C08L 23/16* (2013.01); *C08L 23/28* (2013.01); *C09D 5/002* (2013.01); *C09D 151/06* (2013.01); *C09J 151/06* (2013.01)

(58) Field of Classification Search
CPC ...... C08L 51/06; C08F 220/20; C08F 220/14; C08F 255/02; C08F 255/023; C08F 255/04; C08F 255/06; C08F 285/02; C08F 285/00; C08F 220/06
See application file for complete search history.

(56) References Cited

U.S. PATENT DOCUMENTS

| | | | |
|---|---|---|---|
| 4,897,433 A | * | 1/1990 | Sugo .................. C08F 291/185 427/2.24 |
| 10,774,167 B2 | | 9/2020 | Komoto |
| 2009/0061247 A1 | | 3/2009 | Chino et al. |
| 2018/0371142 A1 | | 12/2018 | Komoto |

FOREIGN PATENT DOCUMENTS

| | | | |
|---|---|---|---|
| JP | 63-145662 A | | 6/1988 |
| JP | 9-76700 A | | 3/1997 |
| JP | 2000007979 A | * | 1/2000 |
| JP | 2000-44766 A | | 2/2000 |
| JP | 3318925 B2 | | 8/2002 |
| JP | 2009-149841 A | | 7/2009 |
| JP | 4420314 B2 | | 2/2010 |
| JP | 2013-56986 A | | 3/2013 |
| JP | 2014-19804 A | | 2/2014 |
| JP | 2017-165838 A | | 9/2017 |
| WO | WO 2017/110633 A1 | | 6/2017 |
| WO | WO 2017/141326 A1 | | 8/2017 |
| WO | WO-2017141326 A1 * | | 8/2017 ............ C08F 255/00 |
| WO | 2018/062182 A1 | | 4/2018 |

OTHER PUBLICATIONS

Sun et al. Macromolecules 43, 9668-9673 (Year: 2010).*
International Search Report dated Dec. 17, 2019 in PCT/JP2019/037683 filed on Sep. 25, 2019, 3 pages.
Japanese Office Action dated Aug. 1, 2023 in Patent Application No. 2022-454414 with English machine translation.
Chinese Office Action dated Jul. 20, 2023 in Patent Application No. 201980065089.0 with English machine translation.
Zhang Xuemin et al., "Paint and Coating Technology" Chapter II Synthetic Resings, with Engiish translation, 27 pages.

* cited by examiner

*Primary Examiner* — Mark S Kaucher
(74) *Attorney, Agent, or Firm* — Oblon, McClelland, Maier & Neustadt, L.L.P.

(57) ABSTRACT

Provided is a resin composition having a large proportion of polyolefin components, allowing preparation of a solution having a high solid content, having a good solution property after long-term storage, having good pigment dispersibility, and including a modified product of component (A): polyolefin resin with component (B): (meth)acrylic acid and/or (meth)acrylic acid ester, in which the weight ratio of the component (A) to the component (B) ((A)/(B)) is 90/10 to 30/70, and the component (B) contains 20% by weight or more of component (B1): an alkoxy (poly)alkylene glycol mono(meth)acrylic acid ester.

20 Claims, No Drawings

RESIN COMPOSITION AND USES THEREOF

CROSS-REFERENCE TO RELATED APPLICATIONS

The present application is the national stage of international application PCT/JP2019/037683, filed on Sep. 25, 2019, and claims the benefit of the filing date of Japanese Appl. No. 2018-187063, filed on Oct. 2, 2018.

FIELD

The present invention relates to a resin composition and uses thereof.

BACKGROUND

The plastic base material used for automobile parts and the like has low surface free energy and has crystallinity, and therefore it is difficult for a coating material to adhere to the plastic base material. As one of the methods for improving the adhesion of the coating material to the plastic base material, a method of applying a pretreatment agent to the plastic base material before coating has been invented and put into practical use. A coating material including a primer, which is a component having good adhesion to the plastic base material, is used as the pretreatment agent.

Chlorinated polyolefin is used as one of the primer components having good adhesion to the plastic base material. For example, as such chlorinated polyolefins, Patent Literature 1 has disclosed primer resin compositions including chlorinated products of polypropylene, polyethylene, ethylene-propylene copolymer, ethylene-propylene-diene copolymer, and the like.

The coating material including the primer component is applied to the bottom layer of the base material, and therefore the pigment component is often added to the coating material, from the viewpoint of weather resistance deterioration. In order to uniformly disperse the pigment component in the coating material, a relatively high-polar resin component such as an acrylic resin or a polyester resin may be blended as a pigment dispersant. The chlorinated polyolefins as primer components have a relatively low polarity, and therefore may be inferior in compatibility with pigments or pigment dispersants. For example, if the above primer resin composition is blended in a coating material including a pigment and a pigment dispersant, precipitation of the pigment component may be induced.

As one of the methods for improving the compatibility between the chlorinated polyolefin and the component in the coating material, a compatibilizer may be blended in the coating material. As such a compatibilizer, a chlorinated polyolefin modified with a (meth)acrylic monomer is widely used.

For example, Patent Literature 2 has disclosed a resin composition obtained by treating a chlorinated polyolefin resin with a (meth)acrylic monomer including an ethylene unsaturated bond and a hydroxy group, and then graft-copolymerizing the (meth)acrylic monomer. In addition, Patent Literature 3 has disclosed a modified resin composition, of a chlorinated polyolefin resin, obtained by using a modifier including a predetermined (meth)acrylic monomer. These modified chlorinated polyolefins are often dispersed in organic solvents to obtain solution products in order to improve workability.

CITATION LIST

Patent Literature

Patent Literature 1: Japanese Patent No. 4420314
Patent Literature 2: Japanese Patent No. 3318925
Patent Literature 3: International Publication No. WO 2017/110633

SUMMARY

Technical Problem

When the above modified chlorinated polyolefin is blended in a coating material, the proportion of the chlorinated polyolefin component in the coating material is reduced, and this causes the problem of lowering the adhesion of the coating film. In order to ensure the adhesion of the coating film while blending the modified chlorinated polyolefin, the proportion of the polyolefin component in the modified chlorinated polyolefin is preferably increased. In addition, in order to reduce the cost at manufacturing the coating material, the solution product of modified polyolefin preferably has a large proportion of the resin component (that is, a high solid content).

However, the conventional modified chlorinated polyolefin has a problem of remarkably lower solution stability when the proportion of the chlorinated polyolefin component is increased and the solid content is increased. For example, when the conventional solution product of chlorinated polyolefin is left to stand for several months for overseas transportation or long-term storage of inventory, two-layer separation of the product or generation of aggregates may occur. In addition, if the proportion of the chlorinated polyolefin component is increased, the pigment dispersibility may be lowered.

For example, the proportion of the chlorinated polyolefin component in the modified chlorinated polyolefin described in Patent Literature 2 is increased, easily generating aggregates in allowing to stand at room temperature for 3 months. In addition, the chlorinated polyolefin component is blended in a coating material including a pigment, easily precipitating the pigment. In addition, the proportion of the chlorinated polyolefin component in the modified chlorinated polyolefin described in Patent Literature 3 is increased, easily resulting in two-layer separation of the product in allowing to stand at room temperature for 3 months. In addition, the chlorinated polyolefin component is blended in a coating material including a pigment, easily deteriorating the finishing of the coating film.

Therefore, desired is the modified polyolefin having a large proportion of the polyolefin component as an adhesive component, allowing preparation of the solution with a high solid content, having a good solution property after long-term storage for several months, and having good pigment dispersibility.

The subject of the present invention is to provide a resin composition having a large proportion of polyolefin components (resin components), allowing preparation of a solution having a high solid content, having a good solution property after long-term storage, and good pigment dispersibility.

Solution to Problem

As a result of intensive investigation by the present inventors on the above problems, the above problems can be solved by including a modified product of the polyolefin resin modified with (meth)acrylic acid and/or (meth)acrylic acid ester containing 20° by mass or more of an alkoxy (poly)alkylene glycol mono(meth)acrylic acid ester, and the present invention has been completed.

That is, the present inventors provide the following [1] to [8].

[1] A resin composition, comprising a modified product of component (A): polyolefin resin with component (B): (meth)acrylic acid and/or (meth)acrylic acid ester, wherein a weight ratio of the component (A) to the component (B) ((A)/(B)) is 90/10 to 30/70, and the component (B) contains 20% by weight or more of component (B1): an alkoxy (poly)alkylene glycol mono(meth)acrylic acid ester represented by the following general formula (I):

$$CH_2=C(R^1)COO—(CH_2—CH_2—O—)_n—R^2 \quad (I)$$

(where $R^1$ represents a hydrogen atom or a methyl group, $R^2$ represents a hydrogen atom or an alkyl group having 1 to 4 carbon atoms, and n represents an integer of 1 to 18, and when $R^2$ is a hydrogen atom, n is an integer of 2 or more).

[2] The resin composition according to [1], wherein weight average molecular weight is 10,000 to 200,000.

[3] The resin composition according to [1] or [2], wherein the component (A) is an acid-modified polyolefin resin.

[4] The resin composition according to any one of [1] to [3], wherein the component (A) is a chlorinated polyolefin resin or acid-modified chlorinated polyolefin resin.

[5] The resin composition according to any one of [1] to [4], further comprising an organic solvent.

[6] A primer coating material comprising the resin composition according to any one of [1] to [5].

[7] A binder comprising the resin composition according to any one of [1] to [5].

[8] An adhesive comprising the resin composition according to any one of [1] to [5].

Advantageous Effects of Invention

The present invention can provide a resin composition having a large proportion of polyolefin components, allowing preparation of a solution having a high solid content, having a good solution property after long-term storage, and good pigment dispersibility.

DESCRIPTION OF EMBODIMENTS

Hereinafter, the present invention will be described in detail according to preferred embodiments thereof. In the present description, the notation "AA to BB" means AA or more and BB or less. The term "(meth)acrylic acid" includes acrylic acid and methacrylic acid, and means at least one of acrylic acid and methacrylic acid. The term "(meth)acrylic acid ester" includes an acrylic acid ester and a methacrylic acid ester, and means at least one of the acrylic acid ester and the methacrylic acid ester.

1. Resin Composition

The resin composition of the present invention includes a modified product of component (A): polyolefin resin with component (B): (meth)acrylic acid and/or (meth)acrylic acid ester (hereinafter, the modified product is also referred to as "resin component"). In addition, the weight ratio of the component (A) to the component (B) ((A)/(B)) is 90/10 to 30/70. Furthermore, the component (B) contains 20% by weight or more of the component (B1): an alkoxy (poly)alkylene glycol mono(meth)acrylic acid ester represented by the general formula (I):

$$CH_2=C(R^1)COO—(CH_2—CH_2—O—)_n—R^2 \quad (I)$$

where $R^1$ represents a hydrogen atom or a methyl group, $R^2$ represents a hydrogen atom or an alkyl group having 1 to 4 carbon atoms, and n represents an integer of 1 to 18. However, when $R^2$ is a hydrogen atom, n is an integer of 2 or more.

Component (A): Polyolefin Resin

The polyolefin resin may be a polymer of olefins. Among the olefin polymers, the polyolefin resin is: preferably a polyolefin resin obtained by using a Ziegler-Natta catalyst or a metallocene catalyst as a polymerization catalyst; more preferably a polypropylene resin or a polyolefin resin obtained by copolymerizing propylene and an α-olefin (for example, ethylene, butene, 3-methyl-1-butene, or 3-methyl-1-heptene), which is obtained by using the Ziegler-Natta catalyst or the metallocene catalyst as the polymerization catalyst; further preferably a propylene-based random copolymer obtained by using the metallocene catalyst as the polymerization catalyst; and still more preferably a polypropylene, ethylene-propylene copolymer, propylene-butene copolymer, or ethylene-propylene-butene copolymer obtained by using the metallocene catalyst as the polymerization catalyst. When the metallocene catalyst is used, the obtained polyolefin resin has a narrow molecular weight distribution, excellent random copolymerizability, a narrow composition distribution, and a wide range of copolymerizable comonomer.

The term "propylene-based random copolymer" refers to a polyolefin resin obtained by randomly copolymerizing polypropylene, propylene, and α-olefin, and examples thereof include polypropylene, an ethylene-propylene copolymer, a propylene-butene copolymer, an ethylene-propylene-diene copolymer, and an ethylene-propylene-butene copolymer. The (co)polymer constituting the polyolefin resin may be one singly or a combination of a plurality of (co)polymers.

Known metallocene catalysts can be used.

Examples thereof include catalysts obtained by combining component (1) and component (2), and further component (3) as necessary. Among them, the metallocene catalyst is preferably a catalyst obtained by combining the component (1) and the component (2), and further the component (3) as necessary:

Component (1): a metallocene complex that is a transition metal compound having at least one conjugated five-membered ring ligand and groups 4 to 6 of the periodic table;

Component (2): ion-exchangeable layered silicate; and

Component (3): organoaluminum compound.

The structure of the polyolefin resin may be any of an isotactic structure, an atactic structure, a syndiotactic structure, and the like that an ordinary polymer compound can have. Among these structures, a polyolefin resin having the isotactic structure, which can be obtained in using the metallocene catalyst, is preferable in consideration of the adhesion to the polyolefin base material, particularly the adhesion at low temperature drying.

As the component composition of the polyolefin resin, the content of the propylene constituent unit is preferably 60% by weight or more, more preferably 70% by weight or more, and still more preferably 80% by weight or more. When the propylene component is 60% by weight or more, the adhesion (adhesiveness) to the propylene base material can be further improved.

The content of the propylene constituent unit of the polyolefin resin may be the proportion of the raw materials used or the value calculated by NMR analysis.

The polyolefin resin is preferably an acid-modified polyolefin resin that is graft-modified with α,β-unsaturated carboxylic acid or a derivative thereof (hereinafter, also referred to as "acid component"). The graft modification with the acid component can further improve the adhesion, solution stability, and pigment dispersibility of the resin composition.

Examples of the α,β-unsaturated carboxylic acid and the derivative thereof include maleic acid, maleic anhydride, fumaric acid, citraconic acid, citraconic anhydride, mesaconic acid, itaconic acid, itaconic anhydride, aconitic acid, and aconitic anhydride. Among them, maleic anhydride, aconitic anhydride, and itaconic anhydride are preferable, and maleic anhydride is more preferable.

The acid component may be at least one compound selected from the group consisting of the α,β-unsaturated carboxylic acid and the derivative thereof, and may be a combination of one or more of the α,β-unsaturated carboxylic acids and one or more of the derivatives thereof, a combination of two or more of the α,β-unsaturated carboxylic acids, and a combination of two or more of the derivatives of the α,β-unsaturated carboxylic acids.

The graft modification with the acid component can be performed by radically reacting the polyolefin resin with the acid component in the presence of a radical generator.

The radical generator can be appropriately selected from known radical generators. Among them, organic peroxide-based compounds are preferable. Examples of the organic peroxide-based compound include di-t-butyl peroxide, dicumyl peroxide, t-butyl cumyl peroxide, benzoyl peroxide, dilauryl peroxide, cumene hydroperoxide, t-butyl hydroperoxide, 1,4-bis[(t-butylperoxy) isopropyl]benzene, 1,1-bis(t-butylperoxy)-3,5,5-trimethyl cyclohexane, 1,1-bis(t-butylperoxy)-cyclohexane, cyclohexanone peroxide, t-butylperoxybenzoate, t-butylperoxyisobutyrate, t-butylperoxy-3,5,5-trimethylhexanoate, t-butylperoxy-2-ethylhexanoate, t-butylperoxyisopropyl carbonate, and cumylperoxyoctoate. Among them, di-t-butyl peroxide, dicumyl peroxide, and dilauryl peroxide are preferable.

The radical generator may be a single radical generator or a combination of a plurality of radical generators.

The addition amount of the radical generator in the graft modification reaction with the acid component is preferably 0.1 to 100% by mass, and more preferably 1 to 50% by mass, with respect to the total (mass) of the polyolefin resin. The addition amount of 0.1% by mass or more can maintain sufficient graft efficiency. The addition amount of 100% by mass or less can prevent a decrease in the weight average molecular weight of the polyolefin resin.

The graft weight of the acid-modified polyolefin resin is preferably 2 to 20% by weight, and more preferably 5 to 15% by weight. Setting the graft weight within the above range can improve the adhesion to the base material.

The graft weight of the acid-modified polyolefin resin can be measured by using an alkaline titration method based on a method in accordance with JIS K 0070:1992.

The polyolefin resin is preferably a chlorinated polyolefin resin (hereinafter, also referred to as "chlorinated polyolefin resin") or a chlorinated acid-modified polyolefin resin (hereinafter, also referred to as "acid-modified chlorinated polyolefin resin"). Chlorination can further improve the adhesion of the polyolefin resin to the non-polar resin base material and the compatibility thereof with other components.

Examples of the method of chlorinating a polyolefin resin include a method in which a polyolefin resin or an acid-modified polyolefin resin is dissolved in a chlorine-based solvent such as chloroform, and then chlorine gas is blown to introduce chlorine atoms to the polyolefin resin or the acid-modified polyolefin resin.

The chlorine gas can be blown under the irradiation of ultraviolet rays, and can be blown in either the presence or absence of the radical reaction initiator. The pressure at which chlorine gas is blown is not limited, and may be normal or increased. The temperature at which chlorine gas is blown is not particularly limited, and is typically 50 to 140° C.

The organic peroxide-based compounds and azonitriles can be used as the radical reaction initiator. Examples of the organic peroxide-based compound include the above compounds.

At the step of chlorinating the polyolefin resin or the acid-modified polyolefin resin, the chlorine-based solvent in the system is typically distilled off by reducing pressure or the like, or is replaced with an organic solvent.

The chlorine content of the chlorinated polyolefin resin or the acid-modified chlorinated polyolefin resin is preferably 10 to 40% by weight, and more preferably 15 to 30% by weight. Setting the chlorine content to the above range can adjust the polarity of the resin component to a certain range, resulting in improved compatibility with other resins in the coating material and further providing sufficient adhesion to a non-polar base material such as the polyolefin base material.

The chlorine content of the chlorinated polyolefin resin or the acid-modified chlorinated polyolefin resin can be measured based on JIS-K7229:1995.

The lower limit of the weight average molecular weight (Mw) of the polyolefin resin is preferably 10,000 or more, and more preferably 20,000 or more. The weight average molecular weight is 10,000 or more, allowing the cohesive force of the resin composition to be sufficient and the adhesion to a base material to be excellent. In addition, the upper limit thereof is preferably 200,000 or less, and more preferably 150,000 or less. The weight average molecular weight is 200,000 or less, allowing provision of good compatibility with other resins different from the resin component of the resin composition of the present invention in the coating material, and allowing provision of excellent adhesion to a base material.

The weight average molecular weight can be determined from a standard polystyrene calibration curve by the gel permeation chromatography (GPC) method. The measurement conditions of GPC are described below.

Apparatus: HLC-8320GPC (manufactured by Tosoh Corporation)
Column: TSK-gel G-6000 H×L, G-5000 H×L, G-4000 H×L, G-3000 H×L, and G-2000 H×L (manufactured by Tosoh Corporation)
Eluent: THF
Flowrate: 1 mL/min
Temperature: Pump oven and column oven at 40° C.
Injection volume: 100 μL
Standard substance: Polystyrene EasiCal PS-1 (manufactured by Agilent Technologies, Inc.)
Component (B): (Meth)Acrylic Acid and/or (Meth) Acrylic Acid Ester The term "(meta)acrylic acid and/or (meth)acrylic acid ester" refers to a compound including at least one (meth)

acryloyl group (meaning at least any of an acryloyl group and a methacryloyl group) in the molecule.

The component (B) includes component (B1): an alkoxy (poly)alkylene glycol mono(meth)acrylic acid ester represented by the general formula (I):

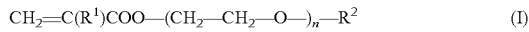

$$CH_2=C(R^1)COO-(CH_2-CH_2-O-)_n-R^2 \quad (I)$$

where $R^1$ represents a hydrogen atom or a methyl group, $R^2$ represents a hydrogen atom or an alkyl group having 1 to 4 carbon atoms, and n represents an integer of 1 to 18. However, when $R^2$ is a hydrogen atom, n is an integer of 2 or more.

The content of the component (B1) in the component (B) is 20% by weight or more. This generates a suitable interaction between the structural unit in the general formula (I) and the pigment component when the resin composition is blended into the coating material, thereby allowing improvement in pigment dispersibility. In addition, the structural unit in the general formula (I) can improve the dispersibility of the resin component in the dispersion medium, thereby allowing improvement in the solution stability of the dispersion solution. Since the solution stability of the dispersion solution is improved, the solution stability can be maintained even if the proportion of the resin component in the dispersion solution is increased (even if the solid content is high).

In the component (B), the component (B1) may be used singly or in combination of two or more.

Examples of the component (B1) include 2-methoxyethyl (meth)acrylate, 2-ethoxyethyl (meth)acrylate, methylcarbitol (meth)acrylate, ethyl carbitol (meth)acrylate, methoxytetraethylene glycol (meth)acrylate, ethoxytetraethylene glycol (meth)acrylate, n-butoxytetraethylene glycol (meth)acrylate, polyethylene glycol (meth)acrylate, and ethoxypolyethylene glycol (meth)acrylate. Among them, 2-methoxyethyl (meth)acrylate, 2-ethoxyethyl (meth)acrylate, methylcarbitol (meth)acrylate, and ethylcarbitol (meth)acrylate are preferable.

The component (B) may include (meth)acrylic acid and/or (meth)acrylic acid ester other than the component (B1) (hereinafter, also referred to as "component (B2)").

Examples of the component (B2) include (meta)acrylic acid, methyl (meth)acrylate, ethyl (meth)acrylate, n-butyl (meth)acrylate, cyclohexyl (meth)acrylate, hydroxyethyl (meth)acrylate, isobornyl (meth)acrylate, glycidyl (meth) acrylate, octyl (meth)acrylate, lauryl (meth)acrylate, tridecylic (meth)acrylate, stearyl (meth)acrylate, cyclohexyl (meth)acrylate, benzyl (meth)acrylate, phenyl (meth)acrylate, dimethylaminoethyl (meth)acrylate, diethylaminoethyl (meth)acrylate, 2-hydroxyethyl (meth)acrylate, N,N-dimethylaminoethyl (meth)acrylate, and acetoacetoxyethyl (meth)acrylate.

Examples of the type of the functional group included in the component (B) include a hydroxy group, a carboxy group, an alkoxysilyl group, an amide group, and a thiol group. The resin component in the resin composition may have only one of these functional groups, or may have two or more thereof.

The resin component in the resin composition has these functional groups, occurring interaction or improving affinity with other components in a top coating material, and thereby improving the adhesion of the coating film. In addition, this exerts a suitable interaction with a pigment and improves the dispersibility of the pigment.

Examples of the typical method of modifying a polyolefin resin to obtain a modified product by using the component (B) include a solution method in which a polyolefin resin is dispersed in an organic solvent to perform a modification reaction and a melting method in which a polyolefin resin is heated and melted to perform the modification reaction.

In the solution method, the polyolefin resin is dissolved in an organic solvent, and then the reaction is performed by heating and stirring with the component (B) in the presence of a radical reaction initiator. The solution method has an advantage of allowing provision of a uniform graft polymer due to limited side reactions.

An aromatic hydrocarbon solvent such as toluene or xylene is preferably used as an organic solvent. The temperature during the reaction is preferably 60 to 180° C.

In the melting method, the polyolefin resin is heated and melted in the presence of a radical reaction initiator to react with the component (B). The melting method has the advantages of easy operation and allowing a short time reaction.

The temperature for heating and melting may be at least the melting point of the polyolefin resin, and is preferably at least the melting point of the polyolefin resin and 300° C. or less. In heating and melting, apparatus such as a Banbury mixer, a kneader, and an extruder can be used.

Examples of the radical reaction initiator used in performing modification by using the component (B) include organic peroxide-based compounds and azonitriles.

Examples of the organic peroxide-based compound include di-tert-butyl peroxide, dicumyl peroxide, tert-butyl cumyl peroxide, benzoyl peroxide, dilauryl peroxide, 2,5-dimethyl-2,5-di (tert-butylperoxy) hexane, cumene hydroperoxide, tert-butyl hydroperoxide, 1,1-bis (tert-butylperoxy)-3,5,5-trimethylcyclohexane, 1,1-bis(tert-butylperoxy)-cyclohexane, cyclohexanone peroxide, tert-butylperoxybenzoate, tert-butylperoxyisobutyrate, tert-butylperoxy-3,5,5-trimethylhexanoate, tert-butylperoxy-2-ethylhexanoate, tert-butylperoxyisopropyl carbonate, and cumylperoxyoctoate.

The radical reaction initiator may be selected from those which have an appropriate half-life temperature according to the temperature at which radical polymerization is performed.

In the resin component in the resin composition, the weight ratio ((A)/(B)) of the polyolefin resin to the component (B) is in the range of 90/10 to 30/70. The weight ratio ((A)/(B)) is within such a range, allowing provision of a resin composition having excellent pigment dispersibility and excellent adhesion to a base material.

One embodiment of the resin composition includes an embodiment further including the above resin component (modified product of the polyolefin resin with the component (B)) and an organic solvent. This embodiment can be an embodiment of a dispersion solution in which the resin component is dispersed in an organic solvent. Examples of the organic solvent include: aromatic solvents such as toluene and xylene; ester solvents such as ethyl acetate and butyl acetate; ketone solvents such as methyl ethyl ketone, methyl butyl ketone, and ethyl cyclohexane; and aliphatic or alicyclic hydrocarbon solvents such as cyclohexane, methylcyclohexane, nonane, and decane.

These organic solvents may be used singly or as a mixed solvent of two or more.

In addition, in order to improve the storage stability of the dispersion solution, alcohol (for example, methanol, ethanol, propanol, isopropyl alcohol, and butanol), propylene glycol ether (for example, propylene glycol methyl ether, propylene glycol ethyl ether, and propylene glycol-t-butyl ether) may be used singly or in combination of two or more. In this case, it is preferable to add 1 to 20% by mass with respect to the organic solvent.

2. Primer Coating Material, Binder, and Adhesive

The primer coating material of the present invention, the binder of the present invention (binder for the coating material or ink binder), and the adhesive of the present invention include the above resin composition. Therefore, these are excellent in adhesion, solution stability, and pigment dispersibility, and can be suitably used as a primer for top coating on a polyolefin base material such as an automobile bumper, and as a binder for a coating material with excellent adhesion to top coating materials and clear coating materials.

The primer coating material of the present invention, the binder of the present invention (binder for the coating material or ink binder), and the adhesive of the present invention can be used in a form such as a solution, a powder, or a sheet according to uses. In addition, additives such as antioxidants, light stabilizers, ultraviolet absorbers, and inorganic fillers can be blended as necessary.

EXAMPLES

Hereinafter, the present invention will be described in detail with reference to Examples. The following Examples are for the purpose of suitably explaining the present invention, and do not limit the present invention. Unless otherwise specified, the method of measuring the physical property value or the like is the measurement method described above. In addition, the term "part" means a part by weight.

Weight Average Molecular Weight (Mw)

The measurement was performed by GPC according to the following conditions.

Apparatus: HLC-8320GPC (manufactured by Tosoh Corporation)
  Column: TSK-gel G-6000 H×L, G-5000 H×L, G-4000 H×L, G-3000 H×L, and G-2000 H×L (manufactured by Tosoh Corporation)
  Eluent: THF
  Flowrate: 1 mL/min
  Temperature: Pump oven and column oven at 40° C.
  Injection volume: 100 μL
  Standard substance: Polystyrene EasiCal PS-1 (manufactured by Agilent Technologies CO., Ltd.)

Chlorine Content (% by Weight)

The measurement was performed by the method in accordance with JIS-K7229:1995.

Maleic Anhydride Content (% by Weight)

The measurement was performed by the method in accordance with JIS K 0070:1992 using an alkaline titration method.

Weight Ratio of Polyolefin Resin to Component (B) ((A)/(B))

The calculation was performed from the used amount of each component.

Production Example 1: Production of Acid-Modified Chlorinated Polyolefin Resin (A-1)

One hundred parts of a propylene-based random copolymer as a polyolefin resin (content of propylene constituent unit: 96% by weight, content of ethylene constituent unit: 4% by weight) produced by using a metallocene catalyst as a polymerization catalyst, 10 parts of maleic anhydride as α,β-unsaturated carboxylic acid cyclic anhydride, and 2 parts of di-t-butyl peroxide as a radical generator were uniformly mixed and supplied to a twin-screw extruder (L/D=60, diameter=15 mm, 1st barrel to 14th barrel).

The reaction was performed under the conditions of a residence time of 10 minutes, a rotation speed of 200 rpm, and barrel temperatures of 100° C. (1st. and 2nd. barrels), 200° C. (3rd. to 8th. barrels), 90° C. (9th. and 10th. barrels), and 110° C. (11th. to 14th. barrels). Then, a reduced pressure treatment was performed to remove unreacted maleic anhydride to obtain an acid-modified polypropylene resin modified with maleic anhydride.

One hundred parts of the acid-modified polypropylene resin was put into a glass-lined reaction vessel. Chloroform was added and the resin was sufficiently dissolved under a pressure of 2 kgf/cm$^2$ at a temperature of 110° C., and then 2 parts of azobisisobutyronitrile as a radical generator were added and chlorine gas was blown into the vessel while controlling the pressure inside the vessel to 2 kgf/cm$^2$ to perform chlorination.

After completion of the reaction, 6 parts of an epoxy compound (Eposizer W-100EL, manufactured by Dainippon Ink and Chemicals Co., Ltd.) were added as a stabilizer, and the resultant mixture was supplied to a vented extruder equipped with a suction part for removing solvent in the screw shaft part to be solidified by removing solvent and to obtain an acid-modified chlorinated polyolefin resin (A-1) as an acid-modified chlorinated polypropylene resin. The obtained acid-modified chlorinated polyolefin resin had a weight average molecular weight of 90,000, a maleic anhydride content of 10% by weight, and a chlorine content of 10% by weight.

Production Example 2: Production of Chlorinated Polyolefin Resin (A-2)

One hundred parts of a propylene-based random copolymer (content of propylene constituent unit: 80% by weight, content of ethylene constituent unit: 20% by weight) as a polyolefin resin produced by using a metallocene catalyst as a polymerization catalyst were put into a glass-lined reaction vessel. Chloroform was added and the resin was sufficiently dissolved under a pressure of 2 kgf/cm$^2$ at a temperature of 110° C., and then 4 parts of azobisisobutyronitrile as a radical generator were added and chlorine gas was blown into the vessel while controlling the pressure inside the vessel to 3 kgf/cm$^2$ to perform chlorination.

After completion of the reaction, 6 parts of an epoxy compound (Eposizer W-100EL, manufactured by Dainippon Ink and Chemicals Co., Ltd.) were added as a stabilizer, and the resultant mixture was supplied to a vented extruder equipped with a suction part for removing solvent in the screw shaft part to be solidified by removing solvent and to obtain a chlorinated polyolefin resin (A-2). The obtained chlorinated polyolefin resin had a weight average molecular weight of 20,000 and a chlorine content of 40% by weight.

Production Example 3: Production of Polyolefin Resin (A-3)

One hundred parts of a propylene-based random copolymer as a polyolefin resin (content of propylene constituent unit: 80% by weight, content of ethylene constituent unit: 20% by weight) produced by using a metallocene catalyst as a polymerization catalyst and 6 parts of di-t-butyl peroxide as a radical generator were uniformly mixed and supplied to a twin-screw extruder (L/D=60, diameter=15 mm, 1st barrel to 14th barrel).

The reaction was performed under the conditions of a residence time of 10 minutes, a rotation speed of 200 rpm, and barrel temperatures of 100° C. (1st and 2nd barrels), 200° C. (3rd to 8th barrels), 90° C. (9th and 10th barrels), and 110° C. (11th to 14th barrels) to obtain a polyolefin resin (A-3). The obtained polyolefin resin had a weight average molecular weight of 50,000.

A list of the polyolefin resins produced in Production Examples 1 to 3 is in Table 1 below.

Example 3: Production of Dispersion Solution of Resin Component (C-3)

One hundred parts of the polyolefin resin (A-3) obtained in Production Example 3 was dissolved in 50 parts of toluene, and 5 parts of an epoxy compound (Eposizer

TABLE 1

| Production Example | Type of polyolefin resin | Presence or absence of MAH modification | Presence or absence of chlorination | Content of MAH (% by weight) | Degree of chlorination (% by weight) | Weight average molecular weight |
|---|---|---|---|---|---|---|
| 1 | A-1 | Present | Present | 10 | 10 | 90,000 |
| 2 | A-2 | Absent | Present | — | 40 | 20,000 |
| 3 | A-3 | Absent | Absent | — | — | 50,000 |

MAH: Maleic anhydride

Example 1: Production of Dispersion Solution of Resin Component (C-1)

One hundred parts of the acid-modified chlorinated polyolefin resin (A-1) obtained in Production Example 1 was dissolved in 50 parts of toluene, and 5 parts of an epoxy compound (Eposizer W-131, manufactured by Dainippon Ink and Chemicals Co., Ltd.) was added. To this, 5.5 parts of a peroxyester-based peroxide (Perbutyl O, manufactured by Nippon Oil & Fats Co., Ltd.) was added at 85° C. in a nitrogen atmosphere. Then, a monomer as the polymerizable (meth)acrylic acid ester represented by the component (B-1) listed in Table 2 (10.7 parts of methyl methacrylate, 26.7 parts of cyclohexyl methacrylate, 26.7 parts of 2-methoxyethyl acrylate, 2.7 parts of 2-hydroxyethyl acrylate) was added to perform the reaction at 85° C. for 6 hours. After completion of the reaction, toluene, cyclohexane, and 1-butanol were added so that the final solvent composition was toluene/cyclohexane/1-butanol=76/20/4 (% by weight), and thus a dispersion solution of the resin component (C-1) having a solid content of 50% by weight was obtained. The weight average molecular weight of the resin component modified with the low molecular weight compound was 200,000.

Example 2: Production of Dispersion Solution of Resin Component (C-2)

One hundred parts of the chlorinated polyolefin resin (A-2) obtained in Production Example 2 was dissolved in 50 parts of toluene, and 5 parts of an epoxy compound (Eposizer W-131, manufactured by Dainippon Ink and Chemicals Co., Ltd.) was added. To this, 5.5 parts of a peroxyester-based peroxide (Perbutyl O, manufactured by Nippon Oil & Fats Co., Ltd.) was added at 85° C. in a nitrogen atmosphere. Then, a monomer as the polymerizable (meth)acrylic acid ester represented by the component (B-2) listed in Table 2 (46.7 parts of methyl methacrylate, 140.0 parts of cyclohexyl methacrylate, 46.7 parts of 2-hydroxyethyl acrylate) was added to perform the reaction at 85° C. for 6 hours. After completion of the reaction, toluene, cyclohexane, and 1-butanol were added so that the final solvent composition was toluene/cyclohexane/1-butanol=76/20/4 (% by weight), and thus a dispersion solution of the resin component (C-2) having a solid content of 50% by weight was obtained. The weight average molecular weight of the resin component modified with the low molecular weight compound was 30,000.

W-131, manufactured by Dainippon Ink and Chemicals Co., Ltd.) was added. To this, 5.5 parts of a peroxyester-based peroxide (Perbutyl O, manufactured by Nippon Oil & Fats Co., Ltd.) was added at 85° C. in a nitrogen atmosphere. Then, a monomer as the polymerizable (meth)acrylic acid ester represented by the component (B-1) listed in Table 2 (10.7 parts of methyl methacrylate, 26.7 parts of cyclohexyl methacrylate, 26.7 parts of 2-methoxyethyl acrylate, 2.7 parts of 2-hydroxyethyl acrylate) was added to perform the reaction at 85° C. for 6 hours, and after completion of the reaction, toluene, cyclohexane, and 1-butanol were added so that the final solvent composition was toluene/cyclohexane/1-butanol=76/20/4 (% by weight), and thus a dispersion solution of the resin component (C-3) having a solid content of 50% by weight was obtained. The weight average molecular weight of the resin component modified with the low molecular weight compound was 80,000.

Comparative Example 1: Production of Dispersion Solution of Resin Component (C-4)

One hundred parts of the acid-modified chlorinated polyolefin resin (A-1) obtained in Production Example 1 was dissolved in 50 parts of toluene, and 5 parts of an epoxy compound (Eposizer W-131, manufactured by Dainippon Ink and Chemicals Co., Ltd.) was added. To this, 5.5 parts of a peroxyester-based peroxide (Perbutyl O, manufactured by Nippon Oil & Fats Co., Ltd.) was added at 85° C. in a nitrogen atmosphere. Then, a monomer as the polymerizable (meth)acrylic acid ester represented by the component (B'-3) listed in Table 2 (13.3 parts of methyl methacrylate, 46.7 parts of cyclohexyl methacrylate, and 6.7 parts of 2-hydroxyethyl acrylate) was added to perform the reaction at 85° C. for 6 hours. After completion of the reaction, toluene, cyclohexane, and 1-butanol were added so that the final solvent composition was toluene/cyclohexane/1-butanol=76/20/4 (° by weight), and thus a dispersion solution of the resin component (C-4) having a solid content of 50% by weight was obtained. The weight average molecular weight of the resin component modified with the low molecular weight compound was 200,000.

Comparative Example 2: Production of Dispersion Solution of Resin Component (C-5)

One hundred parts of the acid-modified chlorinated polyolefin resin (A-1) obtained in Production Example 1 was dissolved in 50 parts of toluene, and 5 parts of an epoxy compound (Eposizer W-131, manufactured by Dainippon Ink and Chemicals Co., Ltd.) was added. To this, 5.5 parts of a peroxyester-based peroxide (Perbutyl O, manufactured by Nippon Oil & Fats Co., Ltd.) was added at 85° C. in a nitrogen atmosphere. Then, a monomer as the polymerizable (meth)acrylic acid ester represented by the component (B-1) listed in Table 2 (64.0 parts of methyl methacrylate, 160.0 parts of cyclohexyl methacrylate, 160.0 parts of 2-methoxyethyl acrylate, and 16.0 parts of 2-hydroxyethyl acrylate) was added to perform the reaction at 85° C. for 6 hours. After completion of the reaction, toluene, cyclohexane, and 1-butanol were added so that the final solvent composition was toluene/cyclohexane/1-butanol=76/20/4 (% by weight), and thus a dispersion solution of the resin component (C-5) having a solid content of 50% by weight was obtained. The weight average molecular weight of the resin component modified with the low molecular weight compound was 100,000.

Comparative Example 3: Production of Dispersion Solution of Resin Component (C-6)

One hundred parts of the acid-modified chlorinated polyolefin resin (A-1) obtained in Production Example 1 was dissolved in 50 parts of toluene, and 1 part of an epoxy compound (Eposizer W-131, manufactured by Dainippon Ink and Chemicals Co., Ltd.) was added. To this, 5.5 parts of a peroxyester-based peroxide (Perbutyl O, manufactured by Nippon Oil & Fats Co., Ltd.) was added at 85° C. in a nitrogen atmosphere. Then, a monomer as the polymerizable (meth)acrylic acid ester represented by the component (B-1) listed in Table 2 (0.8 part of methyl methacrylate, 2.1 parts of cyclohexyl methacrylate, 2.1 parts of 2-methoxyethyl acrylate, and 0.2 part of 2-hydroxyethyl acrylate) was added to perform the reaction at 85° C. for 6 hours. After completion of the reaction, toluene, cyclohexane, and 1-butanol were added so that the final solvent composition was toluene/cyclohexane/1-butanol=76/20/4 (% by weight), and thus a dispersion solution of the resin component (C-6) having a solid content of 50% by weight was obtained. The weight average molecular weight of the resin component modified with the low molecular weight compound was 110,000.

A list of monomers as the polymerizable (meth)acrylic acid ester used in Examples 1 to 3 and Comparative Examples 1 to 3 is summarized in Table 2 below.

TABLE 2

| Type of component | Composition of (meth)acrylic ester (% by weight) | | | | | Proportion of component |
|---|---|---|---|---|---|---|
| (B) | MMA | CHMA | 2MTA | HEA | Total | (B1) |
| B-1 | 16 | 40 | 40 | 4 | 100 | 40 |
| B-2 | 20 | 60 | 20 | 0 | 100 | 20 |
| B'-3 | 20 | 70 | — | 10 | 100 | 0 |

MMA: Methyl methacrylate
CHMA: Cyclohexyl methacrylate
2MTA: 2-Methoxyethyl acrylate
HEA: 2-Hydroxyethyl acrylate Regarding the prepared dispersion solutions of the resin components, the stability of the dispersion solution was evaluated, and a test piece was prepared to confirm the adhesion test. In addition, a coating material was prepared by mixing a dispersion solution, a pigment, and a compatibilizer, and the pigment dispersibility and hue stability were also evaluated. Table 3 lists the breakdowns of the compositions of the resin components and the evaluation results. Details of the evaluation method and test method are as follows.

Evaluation of Stability of Dispersion Solution

The dispersion solutions having a solid content of 50% of the resin component prepared in Examples and Comparative Examples were stored at room temperature for 3 months, and then the solution properties were visually observed. Evaluations of A to C indicate that there is no problem in practical use.

A: No thickening or separation of the solution was confirmed, and the appearance was the same as immediately after preparation.

B: No thickening or separation of the solution was observed, but the solution was turbid as compared with immediately after preparation.

C: No separation of the solution was observed, but a slight thickening was observed, or a shadow (haze) was confirmed when the solution was shaken.

D: The solution separates into two layers, thickens significantly, or aggregates were visually observed.

Preparation of Test Piece

The surface of the ultra-high rigidity polypropylene plate was degreased with isopropyl alcohol, spray-coated with a dispersion solution of a resin component so that the dry coating film had a thickness of 10 to 15 μm, and preheated at the temperature of the melting point of the resin component+15° C. for 5 minutes. Then, a 1K base including a resin component was spray-coated, left to stand for 10 minutes, and then a 2K clear was coated. Thereafter, a baking treatment was performed at the temperature of a melting point+15° C. for 30 minutes to prepare a test piece. This test piece was used to perform the following adhesion test.

Adhesion Test

Linear notches reaching the base of a test piece were made vertically and horizontally at 1 mm intervals in the coating film of the test piece to make 100 sections (grids), and cellophane adhesive tape was in close contact with the sections and peeled off in the 180° direction. This operation, that is, the cellophane adhesive tape was in close contact with the sections and peeled off, was repeated 10 times for the same 100 sections, and the adhesion (adhesiveness) was evaluated based on the following criteria. The number of the peeled sections of the coating film is 50 or less (that is, evaluations of A to C), indicating that there is no practical problem.

A: The coating film was not peeled off.

B: The number of sections of the peeled coating film was 1 or more and 10 or less.

C: The number of sections of the peeled coating film was 10 or more and 50 or less.

D: The number of sections of the peeled coating film was more than 50.

Dispersion of Pigment and Preparation of Coating Material Including Pigment

Forty parts of a dispersion solution having a solid content of 50% of the resin component, 20 parts of a pigment, 10 parts of xylene, 10 parts of butyl acetate, and glass beads having the same volume were charged in a batch type SG mill and dispersed for 4 hours (60 mm impeller, 2,000 rpm). Furthermore, 20 parts of acrylic resin was blended and stirred with a disperser to prepare a coating material including a pigment (blue, yellow, red). Table 3 lists the breakdowns of the resin components and pigments used. Details of the pigment and acrylic resin are as follows.

Blue pigment: fastogen Blue 5480 (manufactured by Dainippon Ink and Chemicals Co., Ltd.)

Yellow pigment: HOSTAPEARM YELLOW H3g (manufactured by Clariant Co., Ltd.)

Red pigment: Irgazine DPP Red BO (manufactured by Ciba Specialty Co., Ltd.)

Acrylic resin: Dianal BR-116 (manufactured by Mitsubishi Rayon Co., Ltd.)

The pigment-blended paints (blue, yellow, and red) prepared were evaluated for pigment dispersibility and hue stability by the following methods. The results of the evaluation are listed in Table 3.

Pigment Dispersibility of Coating Material Including Pigment

The obtained coating material was stored at room temperature for 3 days, and then the separated condition of the pigment was visually observed. In addition, the pigment dispersibility was evaluated from the following evaluation criteria with a grind gauge in accordance with the JISK-5600-2-5 dispersity test. The pigment component is dispersed in less than 10 μm size (that is, the evaluations of A to C), indicating no practical problem.

A: The pigment is uniformly dispersed in the coating material, and the color unchanges immediately after preparation.
B: The pigment is uniformly dispersed in the coating material, but shadows (haze) are confirmed in the coating material when the coating material is shaken.
C: The pigment component is dispersed in less than 10 μm size in a grind gauge.
D: The pigment component is 10 μm or more in size.

Hue Stability of Coating Material Including Pigment

A coating material including pigment was stored at room temperature for 3 days, and then applied to a tin plate with an 8 mil doctor blade and dried at 60° C. for 3 minutes. The dried product was color-measured with a digital color difference meter colorimeter (manufactured by Suga Test Instruments Co., Ltd.). From this value and the initial value before storage, ΔE was calculated. The value of ΔE is 10 or less (that is, evaluations of A to C), indicating no practical problem.

A: The value of ΔE is 0.5 or less.
B: The value of ΔE is more than 0.5 and 2 or less.
C: The value of ΔE is more than 2 and 10 or less.
D: The value of ΔE is more than 10.

component (A) in the resin component is neither acid-modified nor chlorinated, and therefore the compatibility with a solvent and the compatibility with a pigment and a compatibilizer are slightly inferior, and the adhesive force to a base material is also slightly inferior. However, this ensures the performance sufficient for practical use due to the modified component (B1).

In Comparative Example 1, the component (B1) is not blended with the component (B), and therefore the compatibility between a polyolefin resin and an organic solvent and the compatibility between the resin component of the resin composition and a pigment and the compatible resin fail to be ensured, and the stability, adhesion, pigment dispersibility, and hue stability are all inferior. In Comparative Example 2, the proportion of the component (A) to the resin component of the resin composition is low, and therefore the adhesion is significantly inferior and it is not suitable for practical use. In Comparative Example 3, the proportion of the component (B) to the resin component of the resin composition is low, and therefore the stability, the pigment dispersibility, and the hue stability of the dispersion solution are inferior and it is not suitable for practical use.

The invention claimed is:

1. A resin composition, comprising:
a modified product of component (A): acid-modified polyolefin resin with component (B): (meth)acrylic acid and/or (meth)acrylic acid ester,
wherein an (A)/(B) weight ratio of the component (A) to the component (B) is in a range of from 90/10 to 30/70, and
wherein the component (B) comprises 20% by weight or more of an (poly)alkylene oxide glycol mono(meth)acrylic acid ester (B1) of formula (I):

$$CH_2=C(R^1)COO-(CH_2-CH_2-O-)_n-R_2 \qquad (I),$$

wherein
$R^1$ is H or a methyl group,
$R^2$ is an alkyl group having 1 to 2 carbon atoms, and
n is 1.

TABLE 3

| | Type of component (A) | Type of component (B) | (A)/(B) | Mw | Stability of dispersion solution | Adhesion | Pigment dispersibility | | | Hue stability |
|---|---|---|---|---|---|---|---|---|---|---|
| | | | | | | | Blue | Yellow | Red | |
| Example 1 | A-1 | B-1 | 60/40 | 200,000 | A | A | A | A | A | B |
| Example 2 | A-2 | B-2 | 30/70 | 30,000 | A | C | A | A | A | A |
| Example 3 | A-3 | B-1 | 60/40 | 80,000 | C | C | B | B | C | C |
| Comparative Example 1 | A-1 | B'-3 | 60/40 | 200,000 | D | D | D | D | D | D |
| Comparative Example 2 | A-1 | B-1 | 20/80 | 10,0000 | A | D | A | B | A | A |
| Comparative Example 3 | A-1 | B-1 | 95/5 | 110,000 | D | A | D | D | D | D |

From the test results, in Example 1, the weight ratio of (A)/(B) in the resin component of the resin composition was within a predetermined range, and therefore the stability, adhesion, and pigment dispersibility of the dispersion solution are all good. In Example 2, the adhesion to the base material is slightly inferior due to the fact that component (A) was not acid-modified, but the stability, pigment dispersibility, and hue stability of the dispersion solution are excellent due to high proportion of the component (B) in the resin component of the resin composition. In Example 3, the 2. The resin composition of claim 1, having a weight average molecular weight in a range of from 10,000 to 200,000.

3. The resin composition of claim 1, wherein the component (B) further comprises a (meth)acrylic acid or (meth)acrylic acid ester other than the (poly)alkylene oxide glycol mono(meth)acrylic acid ester (B1).

4. The resin composition of claim 1, wherein the component (A) is an acid-modified chlorinated polyolefin resin.

5. The resin composition of claim 1, further comprising:
an organic solvent.

6. A primer coating material, comprising:
the resin composition of claim 1.

7. A binder, comprising:
the resin composition of claim 1.

8. An adhesive, comprising:
the resin composition of claim 1.

9. The resin composition of claim 1, wherein the acid-modified polyolefin resin that is graft-modified with an α,β-unsaturated carboxylic acid.

10. The resin composition of claim 1, wherein the acid-modified polyolefin resin that is graft-modified with an α,β-unsaturated carboxylic acid, and
wherein the α,β-unsaturated carboxylic acid comprises maleic acid, maleic anhydride, fumaric acid, citraconic acid, citraconic anhydride, mesaconic acid, itaconic acid, itaconic anhydride, aconitic acid, and/or aconitic anhydride.

11. The resin composition of claim 1, wherein the acid-modified polyolefin resin that is graft-modified with an α,β-unsaturated carboxylic acid, and
wherein the α,β-unsaturated carboxylic acid comprises maleic anhydride, aconitic anhydride, and/or itaconic anhydride.

12. The resin composition of claim 1, wherein the acid-modified polyolefin resin that is graft-modified with an α,β-unsaturated carboxylic acid, and
wherein the α,β-unsaturated carboxylic acid comprises maleic anhydride.

13. The resin composition of claim 1, wherein the component (A) comprises an acid-modified chlorinated polyolefin resin, and
wherein a chlorine content of the acid-modified chlorinated polyolefin resin is in a range of from 10 to 40 wt., measured based on JIS-K7229:1995.

14. The resin composition of claim 1, wherein the component (A) comprises an acid-modified chlorinated polyolefin resin, and
wherein a chlorine content of the acid-modified chlorinated polyolefin resin is in a range of from 15 to 30 wt. %, measured based on J1S-K7229:1995.

15. The resin composition of claim 1, wherein the acid-modified polyolefin resin is grafted and has a graft weight in a range of from 2 to 20 wt. %, measured in accordance with JIS K 0070:1992.

16. The resin composition of claim 1, wherein the acid-modified polyolefin resin has a propylene constituent unit content of 60 wt.

17. A resin composition, comprising:
a modified product of component (A): chlorinated polyolefin resin or acid-modified chlorinated polyolefin resin with component (B): (meth)acrylic acid and/or (meth)acrylic acid ester, wherein
wherein an (A)/(B) weight ratio of the component (A) to the component (B) is in a range of from 90/10 to 30/70, and
wherein the component (B) comprises 20% by weight or more of an (poly)alkylene oxide glycol mono(meth)acrylic acid ester (B1) of formula (I):

$$CH_2=C(R^1)COO-(CH_2-CH_2-O-)_n-R^2 \qquad (I),$$

wherein
$R^1$ is H or a methyl group,
$R^2$ is an alkyl group having 1 or 2 carbon atoms, and
n is 1.

18. The resin composition of claim 17, wherein the component (A) is a chlorinated polyolefin resin.

19. The resin composition of claim 17, wherein the component (A) is an acid-modified chlorinated polyolefin resin.

20. The resin composition of claim 17, wherein a chlorine content of the chlorinated polyolefin resin or the acid-modified chlorinated polyolefin resin is in a range of from 10 to 40 wt., measured based on JIS-K7229:1995.

* * * * *